US009661691B2

United States Patent
Coulas et al.

(10) Patent No.: US 9,661,691 B2
(45) Date of Patent: May 23, 2017

(54) SYSTEM AND METHOD FOR INDUCTION HEATING A HELICAL ROTOR USING A COIL

(71) Applicant: KUDU INDUSTRIES INC., Calgary (CA)

(72) Inventors: James Coulas, Calgary (CA); Robert A. R. Mills, Calgary (CA)

(73) Assignee: SCHLUMBERGER LIFT SOLUTIONS CANADA LIMITED, Calgary (CA)

( * ) Notice: Subject to any disclaimer, the term of this patent is extended or adjusted under 35 U.S.C. 154(b) by 462 days.

(21) Appl. No.: 14/224,208

(22) Filed: Mar. 25, 2014

(65) Prior Publication Data

US 2014/0203011 A1    Jul. 24, 2014

Related U.S. Application Data

(62) Division of application No. 13/017,669, filed on Jan. 31, 2011, now Pat. No. 8,723,088.
(Continued)

(51) Int. Cl.
*H05B 6/40* (2006.01)
*H05B 6/10* (2006.01)
(Continued)

(52) U.S. Cl.
CPC ............ *H05B 6/102* (2013.01); *C21D 1/42* (2013.01); *C21D 9/0068* (2013.01); *C21D 9/28* (2013.01);
(Continued)

(58) Field of Classification Search
CPC ................... H05B 6/40; H05B 6/36
(Continued)

(56) References Cited

U.S. PATENT DOCUMENTS 2,401,899 A   6/1946 Bierwirth et al.
2,641,682 A   6/1953 McKenna
(Continued)

FOREIGN PATENT DOCUMENTS

CA   1034848 A1   7/1978
DE   102006015669 B3   10/2007
(Continued)

OTHER PUBLICATIONS

International Patent Application No. PCT/CA2011/050052, Search Report dated Mar. 14, 2011.
(Continued)

*Primary Examiner* — David Angwin
*Assistant Examiner* — Lawrence Samuels
(74) *Attorney, Agent, or Firm* — Borden Ladner Gervais LLP; Jason R. Mueller-Neuhaus

(57) ABSTRACT

Embodiments of the invention provide a system and method for induction heating a helical rotor of a progressing cavity pump in order to reduce the surface roughness of the rotor. In order to heat the rotor most evenly, it is desired to space the coil as closely around the rotor as possible. The invention provides a mechanism for threading the helical rotor through an induction coil having an interior diameter which is less than the major diameter of the rotor. The induction coil may include one loop and overlapping ends. The rotor to be heated is rotated about its longitudinal axis and advanced axially through the coil as it rotates. The axial speed and rotational speed are synchronized so that the rotor moves one pitch through the coil for each complete rotation.

8 Claims, 11 Drawing Sheets

Related U.S. Application Data

(60) Provisional application No. 61/300,195, filed on Feb. 1, 2010.

(51) Int. Cl.
| | |
|---|---|
| *C21D 1/42* | (2006.01) |
| *C21D 9/00* | (2006.01) |
| *C21D 9/28* | (2006.01) |
| *F04B 15/02* | (2006.01) |
| *F04B 53/00* | (2006.01) |
| *F04C 2/107* | (2006.01) |
| *F04C 15/00* | (2006.01) |
| *C21D 11/00* | (2006.01) |

(52) U.S. Cl.
CPC ............ *F04B 15/023* (2013.01); *F04B 53/00* (2013.01); *F04C 2/1073* (2013.01); *F04C 15/0096* (2013.01); *H05B 6/40* (2013.01); *C21D 11/00* (2013.01); *F04C 2230/41* (2013.01); *F04C 2240/20* (2013.01); *Y02P 10/253* (2015.11)

(58) Field of Classification Search
USPC .......................................... 219/612, 675, 635
See application file for complete search history.

(56) References Cited

U.S. PATENT DOCUMENTS

| | | |
|---|---|---|
| 2,676,233 A | 4/1954 | Foxx |
| 2,752,472 A | 6/1956 | Emerson |
| 3,413,432 A | 11/1968 | Hormann |
| 3,488,236 A | 1/1970 | Van Husen |
| 3,522,405 A | 8/1970 | Seulen et al. |
| 3,659,069 A | 4/1972 | Balzer et al. |
| 3,731,033 A | 5/1973 | Ory |
| 3,737,613 A | 6/1973 | Gillock |
| 3,805,010 A | 4/1974 | Cuvelier |
| 3,915,763 A | 10/1975 | Jennings et al. |
| 4,119,764 A | 10/1978 | Mizuma et al. |
| 4,220,839 A | 9/1980 | De Leon |
| 4,490,411 A | 12/1984 | Feder |
| 4,661,184 A | 4/1987 | Klay |
| 4,675,488 A | 6/1987 | Mucha et al. |
| 6,555,801 B1 | 4/2003 | LeMieux et al. |
| 2004/0099659 A1 | 5/2004 | Johnson |
| 2005/0247704 A1 | 11/2005 | Loveless et al. |
| 2007/0023486 A1 | 2/2007 | Matsuura et al. |
| 2008/0136066 A1 | 6/2008 | Taylor et al. |
| 2009/0098002 A1 | 4/2009 | Coulas |
| 2011/0186566 A1 | 8/2011 | Coulas et al. |

FOREIGN PATENT DOCUMENTS

| | | |
|---|---|---|
| EP | 0795615 A1 | 9/1997 |
| FR | 929414 A | 12/1947 |
| GB | 910078 | 11/1962 |

OTHER PUBLICATIONS

U.S. Appl. No. 13/017,669, Notice of Allowance dated Dec. 26, 2013.

European Patent Application No. 11736585.8, Extended Search Report dated Sep. 18, 2014.

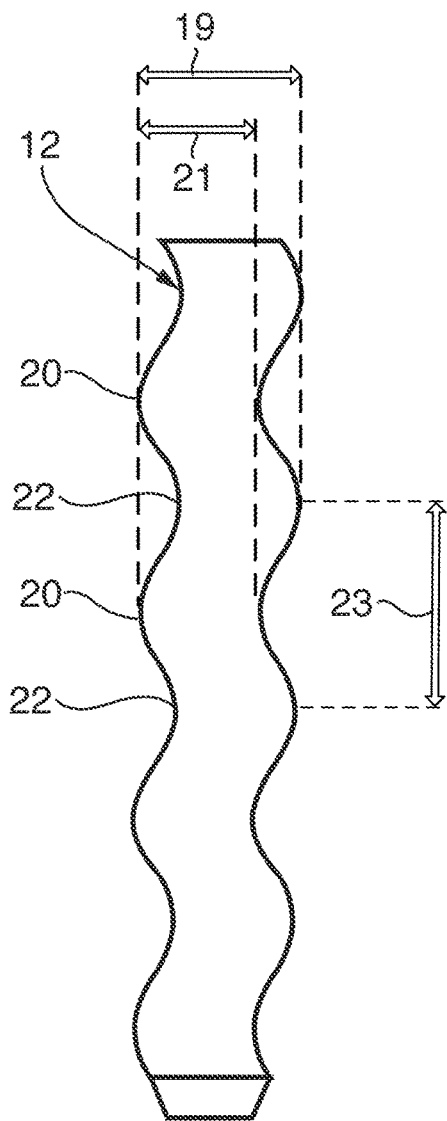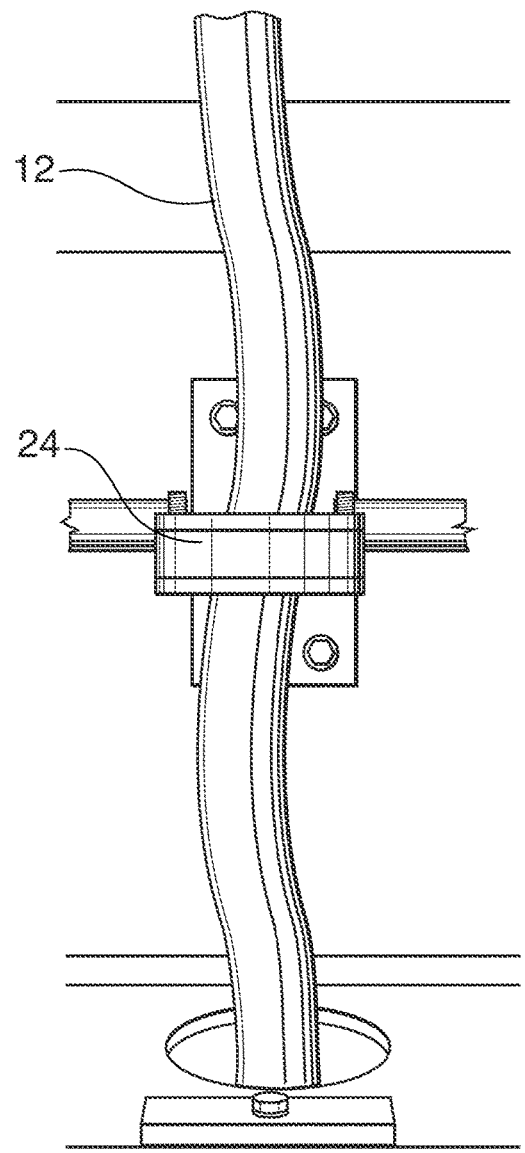
FIG. 2
PRIOR ART
FIG. 3
PRIOR ART

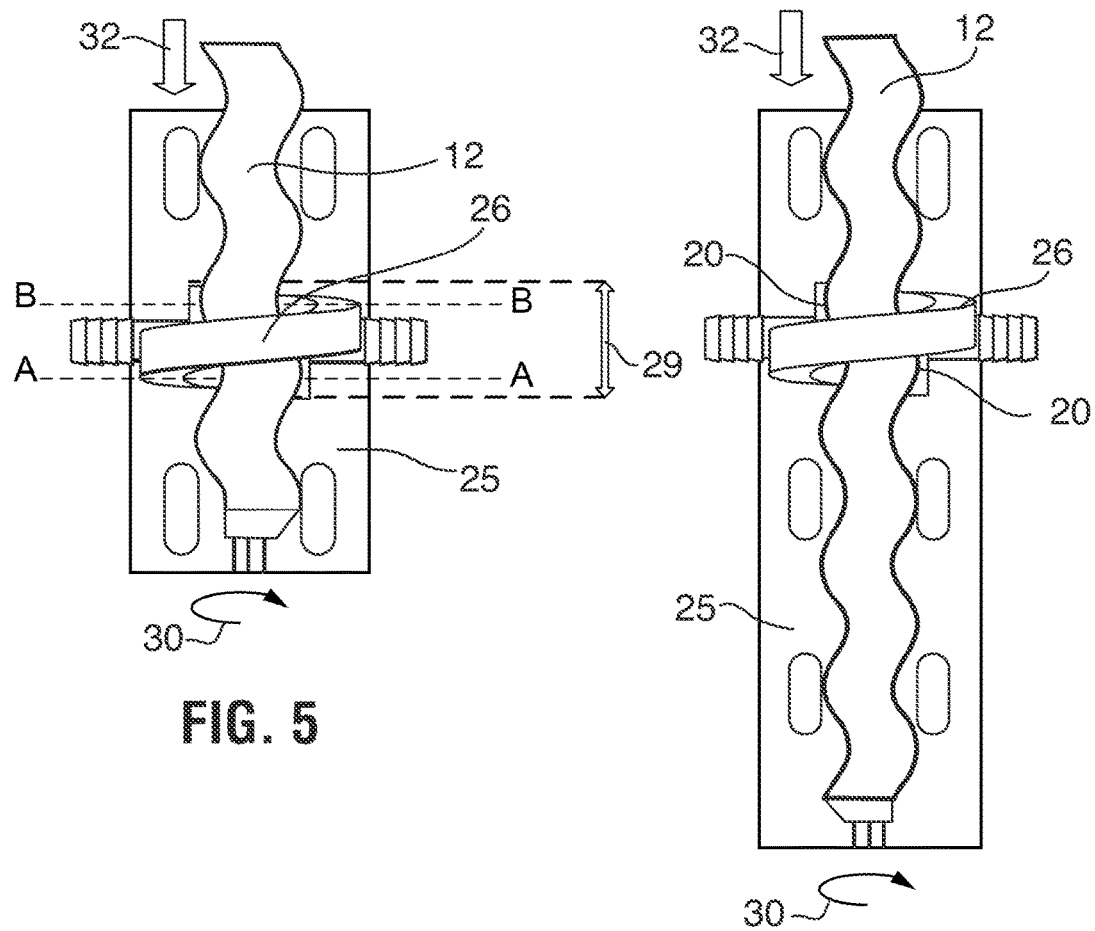
FIG. 5
FIG. 6
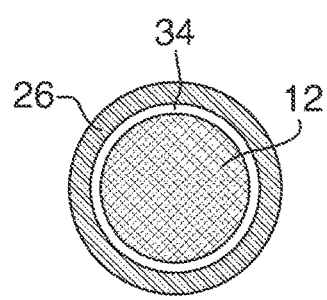
FIG. 7

SYSTEM AND METHOD FOR INDUCTION HEATING A HELICAL ROTOR USING A COIL

CROSS REFERENCE TO RELATED APPLICATIONS

This application is a divisional application of U.S. patent application Ser. No. 13/017,669 filed Jan. 31, 2011 and claims the benefit of priority of U.S. Provisional Patent Application No. 61/300,195 filed Feb. 1, 2010, the contents of which is incorporated herein by reference.

FIELD OF THE INVENTION

The present invention relates generally to wear-resistant hardfacings for movable parts. More particularly, the present invention relates to hardfacings for rotors of progressing cavity pumps/motors.

BACKGROUND OF THE INVENTION

Progressing cavity pumps have been used in water wells for many years. More recently, such pumps have been found to be well suited for the pumping of viscous or thick fluids such as crude oil laden with sand. Progressing cavity pumps include a stator which is attached to a production tubing and a rotor which is attached to the bottom end of a pump drive string and is made of metallic material, usually high strength steel.

Progressing cavity motors are used to provide rotary power sections for use in horizontal and directional drilling. Progressing cavity motors include a stator which is connected with a drillpipe and a rotor which is attached to a drill bit. Drilling fluid is forced down the drillpipe causing rotation of the rotor and operation of the motor to rotate the drill bit.

The rotor is usually electro-plated with chrome to resist abrasion. However, the corrosive and abrasive properties of the fluids produced in oil wells or utilized for drilling fluid frequently cause increased wear and premature failure of the rotor. Since it is important for efficient operation of the pump/motor that a high pressure differential be maintained across the rotor, only small variations in the rotor's dimensions are tolerable. This means that excessively worn rotors must be replaced immediately. However, replacement of the rotor requires pulling the whole pump/motor drive string from the well which is costly, especially in the deep oil well applications which are common for progressing cavity pumps/motors. Consequently, rotors with increased wear resistance and, thus, a longer service life are desired to decrease well drilling and operating costs.

Various hardfacing methods have been used in the past to increase the wear resistance of metal surfaces.

A number of progressing cavity pump/motor manufacturers chrome electroplate the rotors to increase wear resistance. Chrome electroplating does provide increased wear resistance, but is susceptible to corrosion in the harsh environment of downhole production and drilling.

Another way of increasing wear resistance is to deposit a coating or layer of material onto the rotor by thermal spraying. Conventional flame spraying uses a relatively low flame temperature and particle velocity (such as less than about 40 m/s), and results in coatings with high porosity and permeability as well as low bond strength. Nevertheless, it allows the spraying of a layer with much smaller thickness variations, overcoming the problem of uncontrollable thickness variations experienced with other thermal spraying techniques.

In general, conventional flame spraying techniques result in coatings with high porosity and permeability as well as low bond strength, although they do allow the spraying of a layer of sufficiently consistent thickness. Thickness variations on the other hand are a major problem with other coating techniques, such as high velocity oxygen fuel (HVOF) or detonation gun (D-gun) coating. Furthermore, those coating techniques cannot always be used to produce a sufficiently thick coating. In order to prevent failure of the coating during use, the thickness of the coating must be equal to at least 50% of the diameter of any particles to which the coating is exposed during use. Moreover, sufficiently thick coatings, even if achievable are subject to pitting and spelling during use, due to insufficient bond strength with the underlying metal layer.

FIG. 1 is a cross sectional view of a progressing cavity pump/motor 10 described in commonly owned U.S. Patent Publication No. 2009/0098002. This patent publication describes hardfacing the rotor 12 of the progressing cavity pump/motor 10, by roughening the surface of the rotor body prior to flame spraying a metallic coating material onto the roughened surface. FIG. 2 is an elevational view of the rotor 12 shown separately. As shown in FIG. 2, the rotor 12 has the shape of a helix and includes a plurality of crests 20 and valleys 22. The distance 23 between two successive crests or valleys is known as the pitch. The rotor 12 has a major diameter 19, the diameter of the circle circumscribed by the crests 20 upon rotation of the rotor 12. The minor diameter 21 of the rotor 12 is the diameter of the circle circumscribed by the valleys 22 of the rotor.

As shown in FIG. 1, the dimensions of the rotor 12 and stator 14 are coordinated such that the rotor 12 tightly fits into the bore 15 and a number of individual pockets or cavities 13 are formed which are inwardly defined by the rotor 12 and outwardly by the stator 14. Upon rotation of the rotor 12 in the operating direction, the cavities 13 and their contents are pushed spirally about the axis of the stator 14 to the output end of the pump. The seal between the cavities is made possible by an interference fit between the rotor 12 and the elastomeric material of the stator 14. Thus, any surface roughness of the rotor will wear the elastomeric material 14, which requires maintenance of the pump 10.

Flame sprayed hardfacings generally have a grainy surface. Leaving this surface untreated will quickly wear out the stator of the pump. Reducing surface roughness may either be effected by polishing or by fusing of the particles. Polishing involves the use of abrasives. This can be a lengthy and inefficient process with some hardfacing materials. Fusing includes the application of heat to the rough surface at a temperature that melts and fuses the grainy particles in order to make the grainy surface continuous.

The heat treatment may either be applied using flame or induction heating. Due to its helical shape, the main challenge in reducing the surface roughness of the rotor 12 using heat treatment is to evenly distribute the heat throughout the rotor 12 such that the outer surface of the rotor 12 is uniformly heated both at the crests and the valleys, in order to avoid localized overheating or insufficient heating of the rotor, both of which will lead to uneven fusing of the hardcoating.

With flame heating, it is impossible to precisely control the direction of the flame to evenly heat the rotor 12, without leaving unfused areas on the outer surface of the rotor 12, especially since the rotor 12 has a helical shape.

FIG. 3 is an example of induction heating a rotor 12 using a conventional induction coil 24. Conventional induction heating methods include advancing the rotor 12 through the inner circumference of an induction coil 24, as shown in FIG. 3. The induction coil 24 includes a plurality of loops and has a substantially cylindrical interior shape. As the rotor 12 passes through the conventional induction coil 24, a magnetic field is applied from the plurality of waveguide loops onto the rotor 12. The inner diameter of the induction coil is greater than the major diameter 19 of the rotor 12.

However, this method is not efficient, and does not heat the rotor 12 evenly, leading to unfused areas on the rotor. This is due to the spacing between the rotor 12 and the induction coil being lower at the crests 20 than in the valleys 22, which results in the magnetic field being stronger at the crests 20 and more heating of the crests 20 than the valleys 22.

It is, therefore, desirable to provide a system and method for evenly fusing a flame sprayed hardcoating on a helical rotor by induction heating.

SUMMARY OF THE INVENTION

It is an object of the present invention to obviate or mitigate at least one disadvantage of previous induction heating arrangements and processes.

In a first aspect, the present invention provides a method for induction heating a helical rotor having a minor diameter, a major diameter and a pitch length. The method includes the steps of radiating a magnetic field onto the rotor from a circular induction coil having an inner diameter which is greater than the minor diameter of the rotor and smaller than the major diameter of the rotor. The rotor is threaded through the coil by rotating the rotor about its longitudinal axis within an inner circumference of the induction coil, and simultaneously advancing the rotor axially through the induction coil, at an advancement speed synchronized with the rotational speed such that the rotor advances one pitch length for each complete rotation.

The method may comprise the step of providing a helical coil having a single loop and overlapping ends.

In an embodiment, the method comprises the step of providing an axial spacing between the overlapping ends such that an inner surface of the coil substantially matches an exterior shape of the rotor. The method preferably further includes placement of the rotor in the coil so that a crest is opposite the overlapping ends. Positioning of the rotor in this manner, together with threading of the rotor through the coil will result in the cross-section of the rotor within the coil being stationary. This results in a constant spacing between the rotor and the coil which is smaller than in conventional induction heating setups, especially at the valleys of the rotor.

In another embodiment, the method comprises adjusting the position of the rotational axis of the rotor within the inner circumference of the coil relative to the overlapping ends in dependence of the rotor pitch. The step of adjusting may comprise progressively decreasing a spacing between the rotor and the overlapping ends for rotors of increasing pitch length, and progressively increasing a spacing between the rotor and the overlapping ends for rotors of decreasing pitch length.

In another aspect, the invention provides a system for induction heating a helical rotor having a minor diameter, a major diameter and a pitch length. The system includes a rotor support frame, a rotor guide mount on the frame with rotor guide rollers for holding the rotor for rotation about its longitudinal axis and guiding the rotor for advancing the rotor along the longitudinal axis, a coil support and a circular induction coil attached to the support and having an inner diameter which is greater than the minor diameter of the rotor and smaller than the major diameter of the rotor. The coil support is positioned in relation to the frame such that the rotor supported by the frame is advancable by the guide rollers through the coil, and the coil radiates a magnetic field onto the rotor for heating the rotor. The system also comprises a first motor mounted to the frame and connectable to the rotor to rotate the rotor around its longitudinal axis, a second motor connected to the rotor to advance the rotor axially through the coil, and synchronizing means to synchronize an advancement speed of the rotor along the longitudinal axis with the rotational speed about the longitudinal axis to advance the rotor one pitch length through the coil for each complete rotation.

The circular coil may be a helical coil having one loop and overlapping ends. In an embodiment, the overlapping ends are spaced such that an inner surface of the coil substantially matches an exterior shape of the rotor.

The system may also include adjustment means for adjusting the position of the rotor within the inner circumference of the coil with reference to the overlapping ends in dependence of the rotor pitch. In an embodiment, the adjustment means include a direction adjustment rail for adjusting the position of the coil around the rotor.

In an embodiment, the spacing between the rotor and the overlapping ends is progressively decreased for rotors of increasing pitch length.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2 is an elevational view of a rotor of a conventional progressing cavity pump/motor, with the rotor shown separately;

FIG. 3 is an example of induction heating a rotor using a conventional induction coil;

FIG. 5 illustrates a helical coil having an interior surface that fits the exterior shape of the rotor, in accordance with a preferred embodiment of the invention;

FIG. 6 illustrates the position of the rotor inside the helical coil after few rotations of the rotor with reference to FIG. 5;

FIG. 7 is a cross sectional view of the rotor and coil at line A-A of FIG. 5;

DETAILED DESCRIPTION

Generally, the present invention provides a system and method for more evenly heating a helical rotor of a progressing cavity pump by induction heating in order to fuse a sprayed-on layer of hardcoating on the rotor. The invention provides a mechanism for threading the helical rotor through an induction coil having an interior diameter which is smaller than the major diameter of the rotor and larger than the minor diameter of the rotor. In order to heat the rotor most evenly, it is desired to space the coil as closely about the rotor as possible. In known induction heating apparatus, the coil is a helical coil with multiple loops and the inside diameter of the coil is larger than the major diameter of the rotor to be heated. This results in a relatively large spacing of the rotor from the coil at the valleys of the rotor body, and an overall very uneven spacing of the rotor surface from the coil. This causes an uneven heating of the rotor, with the crests being overheated and the valleys being not heated sufficiently, as discussed above with reference to FIG. 3.

Embodiments of the invention provide an induction coil including one loop and preferably with overlapping ends. The rotor to be heated is threaded through the coil, which means it is rotated about its longitudinal axis and advanced axially through the coil as it rotates. The axial advancement speed and the rotational speed are synchronized so that the rotor advances one pitch length through the coil for each complete rotation. In an embodiment, the coil includes an inner surface which substantially matches the exterior shape of the rotor. In another embodiment, the position of the rotor is adjusted within the inner circumference of the coil by adjusting the spacing between the overlapping ends of the coil and the rotor body in accordance with the pitch length of the rotor.

Figure 1:
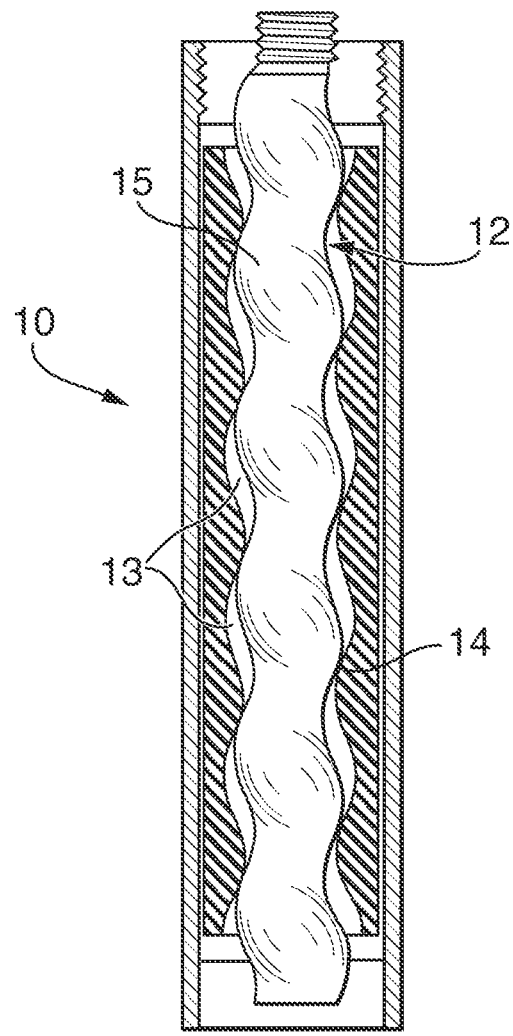
FIG. 1 is a cross sectional view of a conventional progressing cavity pump/motor.
Figure 4:
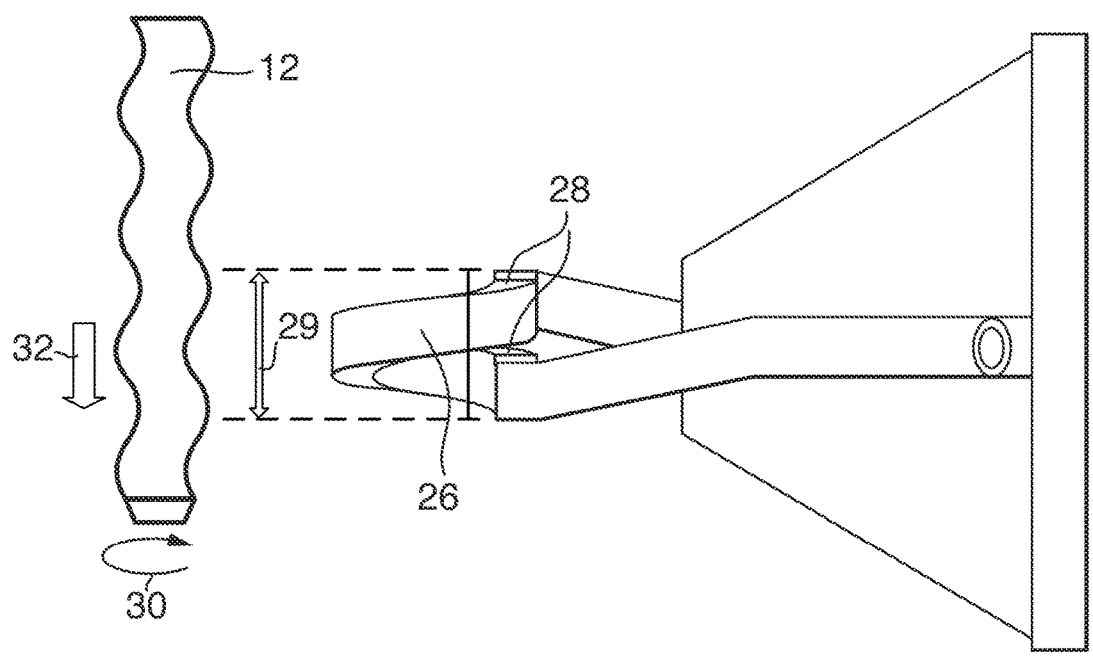
FIG. 4 illustrates a helical coil in accordance with a preferred embodiment of the invention.

FIG. 4 illustrates an example of a helical coil 26 in accordance with a preferred embodiment of the invention. In this embodiment, the interior surface of the helical coil 26 substantially matches the exterior shape of the rotor 12. The helical coil 26 includes one loop with two overlapping ends 28. The overlapping ends 28 define a heating area 29, and are dimensioned so that the interior shape of the coil 26 matches the exterior surface of the rotor 12, as shown in FIGS. 4 and 5 such that the spacing between the rotor 12 and the coil 26 is substantially uniform at the crests and valleys at any time during the heating process. The coil may also include more than one loop, but will have to be shaped to match the shape of the rotor to be heated. In other words, the pitch of the coil must match the pitch of the rotor. This of course requires a different coil for each rotor of different pitch and/or minor diameter.

The rotor 12 is advanced axially through the coil 26, and at the same time rotated within the inner circumference of the coil 26. This results in the rotor being threaded through the coil. The rotation speed of the rotor 12 is synchronized with the axial advancement though the coil 26. For each complete rotation (each 360° rotation) of the rotor 12, the rotor 12 advances through the coil 26 by a distance equal to one pitch length in order to provide an even distribution of heat throughout the rotor 12. With this configuration, it is possible to use a coil 26 having an inner diameter which is less than the major diameter 19 of the rotor 12, and only slightly greater than the minor diameter 21 of the rotor 12. Thereby, reducing the spacing between the rotor 12 and the coil 26, and at the same time heating the rotor 12 evenly at the crests 20 and the valleys 22.

During the heating process, the rotor 12 is rotated about its longitudinal axis, as exemplified by arrow 30 (FIGS. 4-6), and advanced through the coil 26, as exemplified by arrow 32. Because the inner diameter of the coil 26 is less than the major diameter of the rotor 12, it is not possible to advance the rotor 12 through the coil 26 unless the rotor 12 is threaded through the coil 26 by continuously advancing it substantially centrally in the coil at the rate of one pitch length for each complete rotation about its longitudinal axis.

FIG. 6 illustrates the position of the rotor 12 inside the helical coil 26 after few rotations of the rotor 12 from the position shown in FIG. 5. In FIG. 6, the crests 20 of the rotor 12 remain adjacent to the overlapping ends 28 just as in FIG. 5, because due to the threading motion the shape of the rotor 12 in the coil 26 remains stationary. The elevational view of the rotor 12 in the coil 26 within the heating area is the same at anytime during the heating process, as shown in FIG. 6.

In other words, if at the beginning of the process a certain point in the coil 26 is adjacent to a crest 20 of the rotor 12, this point will always be adjacent to a crest 20 of the rotor 12 at any time during the threading process, and will not be adjacent to a valley 22 of the rotor 12.

FIG. 7 is a cross sectional view of the rotor 12 and coil 26 at line A-A of FIG. 5. When the rotor 12 is rotated, and advanced through the coil 26 as exemplified by arrow 32, the spacing 34 between the coil 26 and the rotor 12 is maintained constant at any point within the heating area 29. As shown in FIG. 7, the spacing 34 between the rotor 12 and the coil 26 is uniform at the crest 20 and at the valley 22. Furthermore, the cross sectional view illustrated in FIG. 7 along virtual line A-A of FIG. 5 is the same as the cross sectional view at virtual line B-B, or any other line within the heating area 29 which is parallel to line A-A.

Although the rotors 12 of different progressing cavity pumps 10 will have a similar shape, the pitch 23 may differ form one rotor to another. In an ideal situation of the induction heating method of the invention, each rotor is associated with a coil with an inner shape that matches the exterior shape of the rotor, especially when the coil has multiple loops. However, this is not practical in reality especially for users who have many progressing cavity pumps with different rotor dimensions, because of the high costs involved in obtaining and maintaining a plurality of coils and the accompanying mechanical and electrical equipment needed to operate the coils such as transformers and the like.

In order to address this problem, the invention provides a system and method for using the same induction coil 26 with rotors having different pitches.

Figure 8:
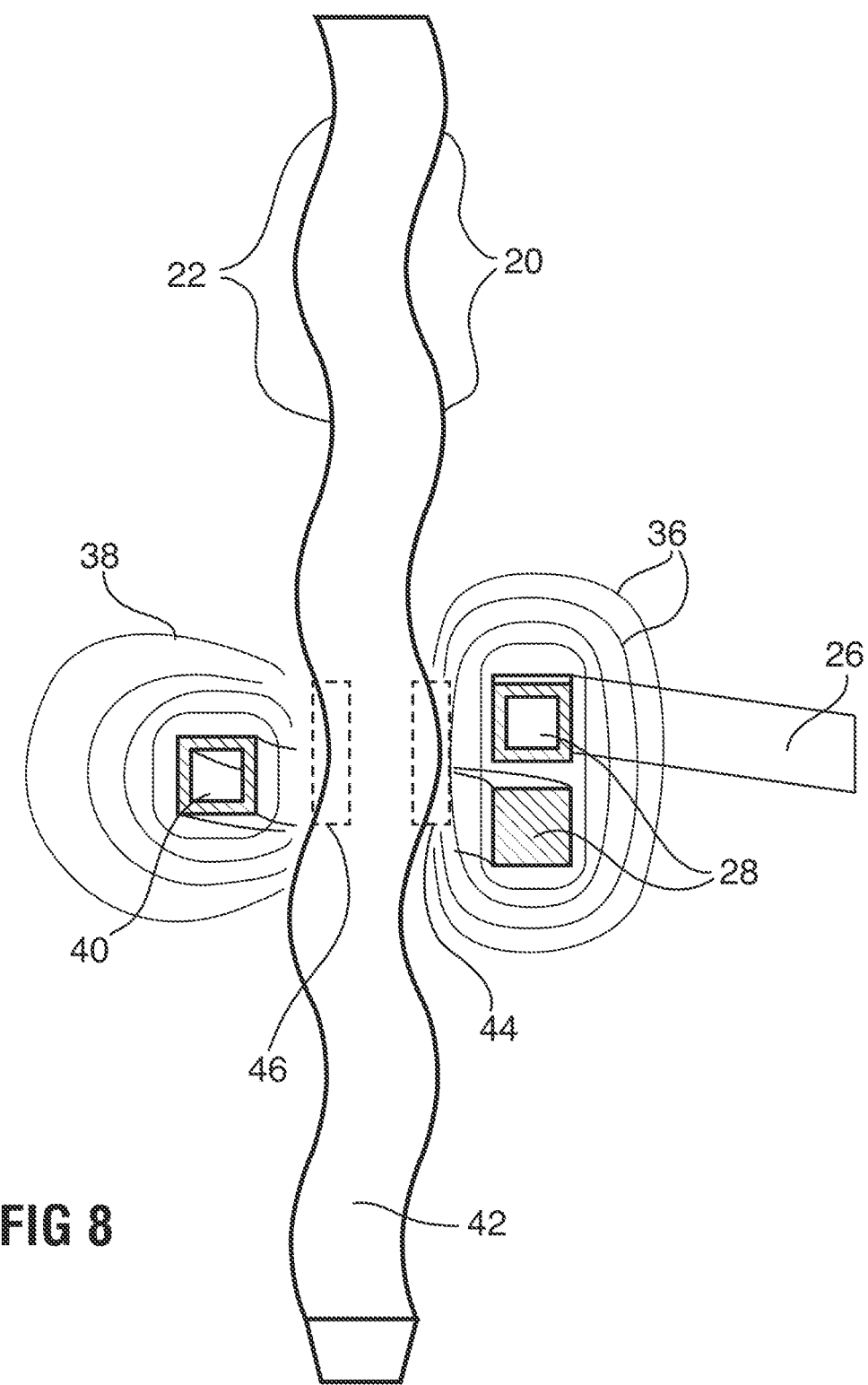
FIG. 8 illustrates the magnetic filed in the helical coil of FIG. 4 and shows the difference in shape between the magnetic field at the overlapping ends of the coil and the portion of the coil that is opposite to the overlapping ends.

Due to the overlapping ends 28 of the coil 26 being closely adjacent, and the field cancellation occurring between the magnetic fields generated by each end 28, the resulting magnetic field 36 at the overlapping ends 28 is elliptical and extends over a wider area in axial direction of the coil as shown in FIG. 8. At the same time, the magnetic field 38 at the single conductor portion 40 of the coil that is opposite to the overlapping ends 28 is circular and more dense due to the absence of any field cancellation. Thus, at the overlap region of the coil the field shape is close to the shape of the crests and the field shape at the location diametrically opposite more closely fits the shape of the valleys.

When the pitch of the rotor increases, the shape of the valleys 22 between two successive crests 20 becomes more oval, as in the rotor 42 illustrated in FIG. 8. For short pitches, the shape of the valleys 22 between two successive crests 20 become more circular as in rotor 12 shown in FIG. 2. Thus, the similarity in shape between the field shape and the rotor shape at the valleys decreases with increasing pitch length and the inductive heating becomes less effective with increasing pitch length. The inventors of the present invention have now surprisingly discovered that the heating efficiency of the valleys can be improved and the overall heating of the rotor made to become more even by adjustment of the spacing between the rotor and the coil at the valleys by moving the rotor axis to and from the overlapping ends of the coil.

Figure 9A:
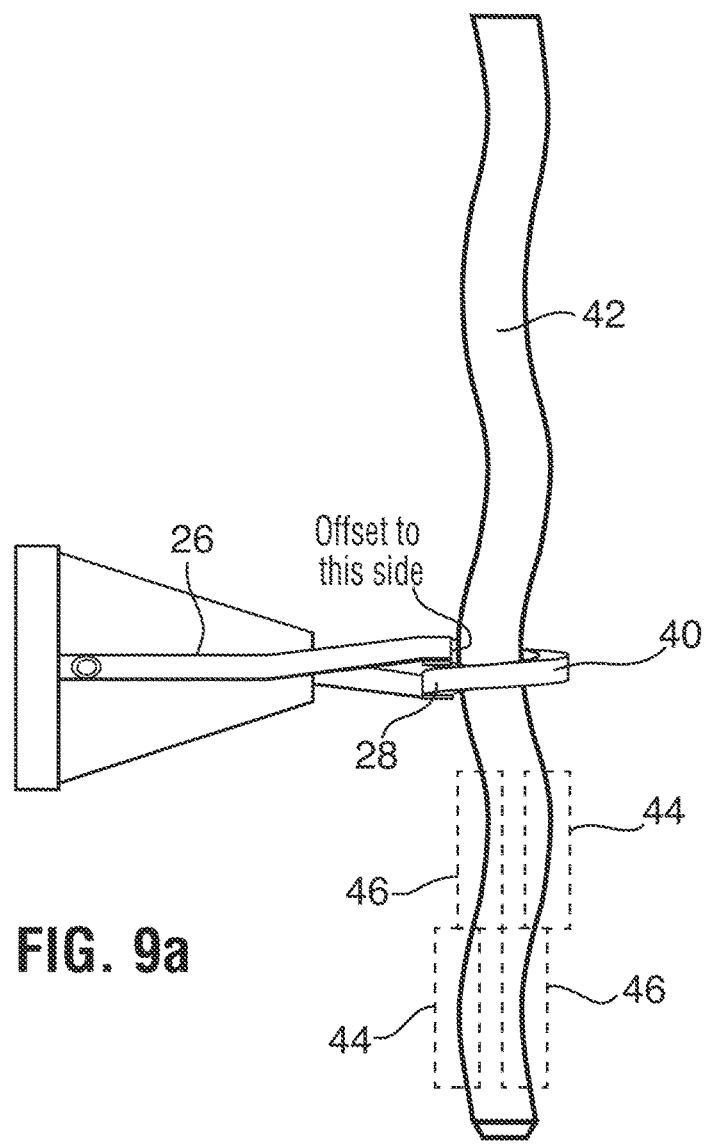
FIG. 9a illustrates a method for adjusting the spacing between a long pitch rotor and the overlapping ends of the helical coil, in accordance with an embodiment of the invention.
Figure 9B:
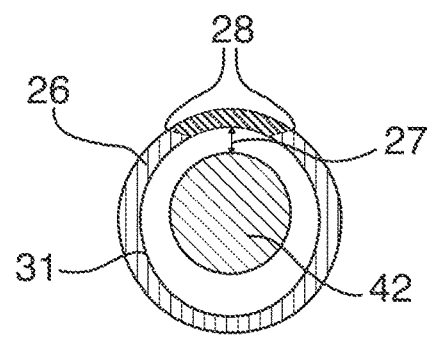
FIG. 9b is a cross sectional view of the long pitch rotor and coil of FIG. 9a, showing the spacing between the rotor and the overlapping ends of the coil within the inner circumference of the helical coil, in accordance with an embodiment of the invention.

Embodiments of the invention provide a system and method for adjusting the position of the rotor 12 within the inner circumference of the helical coil 26 to more closely match the shape of the magnetic field of the coil to the shape of the valleys and crests. This is achieved by adjusting the spacing between the rotor 12 and the overlapping ends 28 of the helical coil 26. FIG. 9a illustrates a method for adjusting the spacing 27 between a long pitch rotor 42 and the overlapping ends 28 of the helical coil 26, in accordance with an embodiment of the invention. FIG. 9b is a cross sectional view of the coil and rotor shown in FIG. 9a, showing the spacing between the rotor 42 and the overlapping ends 28 within the inner circumference 31 of the helical coil 26. For rotors having a longer pitch, such as rotor 42, the position of the rotor 42 within the inner circumference 31 of the helical coil 26 is adjusted by decreasing the spacing 27 between the rotor 42 and the overlapping ends 28 of the coil 26 as shown in FIGS. 9a and 9b. The shallower the valleys 22 with respect to the crests 20, the smaller the spacing 27 between the rotor and the overlapping ends of the coil, in order to evenly heat the crests 20 and the valleys 22.

In this embodiment it is preferable to provide the crest 20 of the rotor 42 substantially between the overlapping ends 28, which makes the corresponding valley 22 to be facing the circular field 38. With this configuration, the area 44 of the rotor 42, substantially including the crest 20 and the upper areas between the crests and the two adjacent valleys (previous valley and next valley) receives more heat from the elliptical shaped magnetic field 36 (shown in FIG. 8) generated by the overlapping ends 28, and the area 46 substantially including the valley 22 and the lower areas between the valley and the adjacent crests (previous crest and next crest) receives less heat from the circular and more intense magnetic field 38 generated by single conductor portion 40 of the coil 26. Thereby, the longer pitch rotor 42 can be evenly heated by decreasing the spacing 27 between the rotor 42 and the overlapping ends 28 of the coil 26.

Figure 10A:
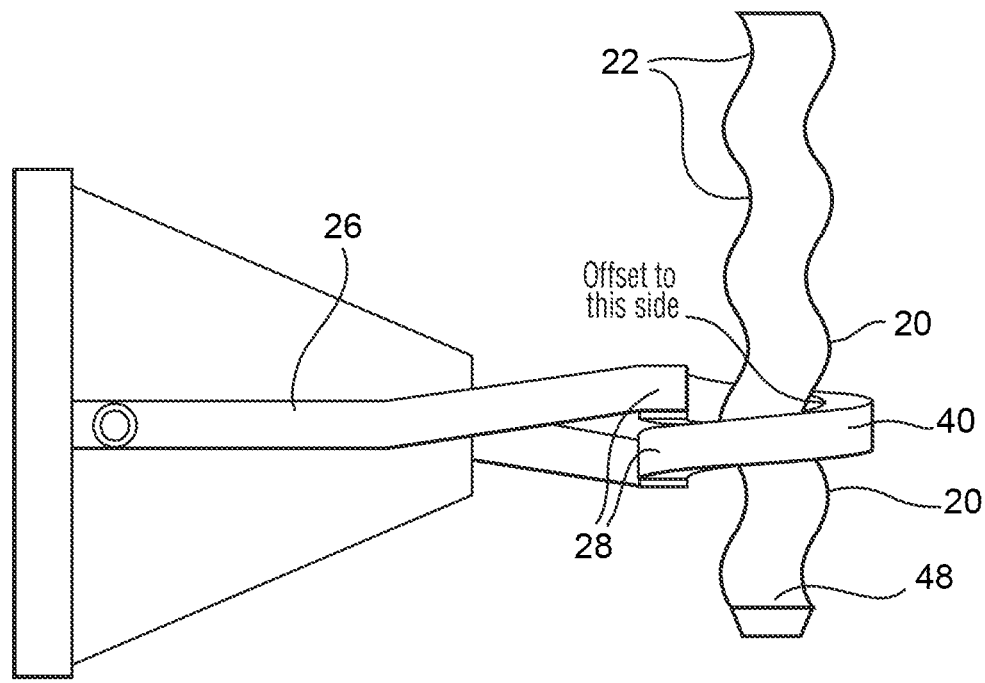
FIG. 10a illustrates a method for adjusting the position of the rotor with respect to the overlapping ends of the helical coil shown in FIG. 4, for short pitch rotors in accordance with another embodiment of the invention.
Figure 10B:
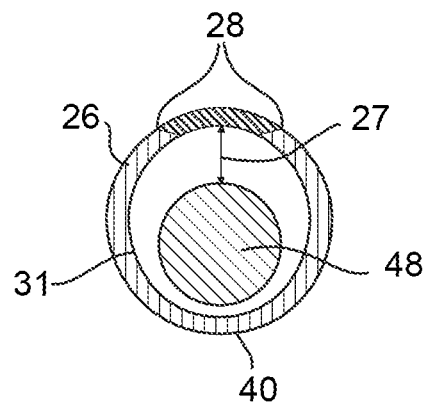
FIG. 10b is a cross sectional view of the short pitch coil and rotor of FIG. 10a, showing the distance between the rotor and the overlapping ends of the coil within the inner circumference of the coil, in accordance with an embodiment of the invention.

FIG. 10a illustrates a method for adjusting the spacing 27 between a short pitch rotor 48 and the overlapping ends 28 of the helical coil 26, in accordance with an embodiment of the invention. FIG. 10b is a cross sectional view of the coil and rotor shown in FIG. 10a, showing the distance between the rotor 48 and the overlapping ends 28 within the inner circumference 31 of the helical coil 26. For rotors having a shorter pitch, the valleys 22 are shifted away from the overlapping ends 28 toward the single portion 40 that is opposite to the overlapping ends 28 of the coil 26 as shown in FIG. 10a. As discussed above, the shape of the valleys 22 between two successive crests 20 becomes circular for rotors having short pitches such as rotor 48 shown in FIG. 10a. At the same time, the magnetic field 38 at the single conductor portion 40 is also circular. Therefore, the shape of the rotor 48 between two crests 20 matches the shape of the magnetic field 38 at the single portion 40. Accordingly, a more even heating may be obtained when the spacing 27 between the rotor 48 and the overlapping ends 28 is increased so that the valleys 22 of the rotor are closer to the single portion 40 of the helical coil 26 as shown in FIGS. 10a and 10b. The deeper the valley 22, the greater the spacing 27 between the rotor and the overlapping ends 28 of the coil, in order to evenly heat the crests 20 and the valleys 22.

Figure 14A:
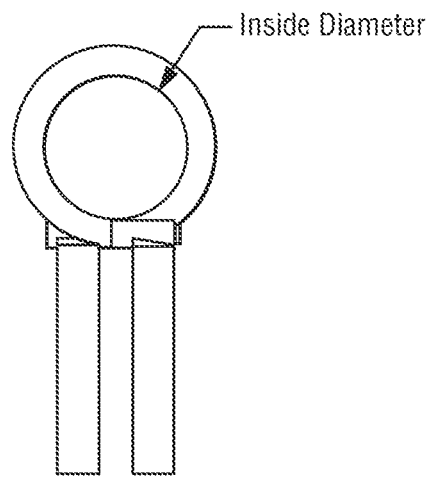
FIGS. 14a and 14b show different views of a helical coil having a circular cross-section, as opposed to the rectangular cross-section shown in the remaining figures.
Figure 14B:
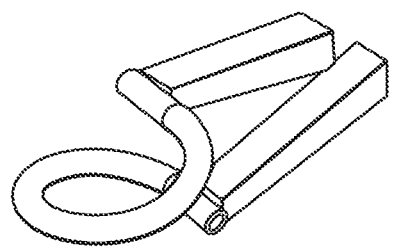

Although, FIGS. 9 and 10 show the helical coil 26 to have a rectangular waveguide for short pitch rotors and long pitch rotors, it is preferred to use rectangular waveguide coils with long pitch rotors because the shape of the magnetic field generated would be more rectangular shaped and wider, and thus, provides more even heating for long pitch rotors. On the other hand, it is preferred to use helical coils having a circular waveguide such as that shown in FIG. 14 for short pitch rotors because circular waveguides radiate a circular magnetic field that matches the circular shape of the rotor between two crests, and thus, provides for more even heating in the short pitch rotors.

Figure 11:
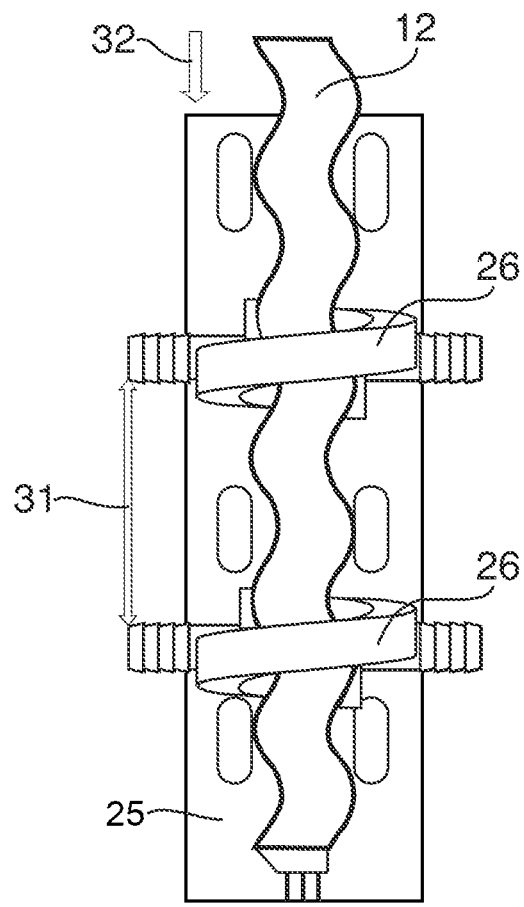
FIG. 11 illustrates an induction heating method using more than one coil, in accordance with an embodiment of the invention.

In the embodiments described herein, it is possible to use more than one induction coil 26. To be coaxial on the frame 25, the distance 31 between two coils 26 should be equal to an n number of pitches with n being an integer greater to or equal to one as shown in FIG. 11. In the example shown in FIG. 11, the distance 41 between the two coils 26, is equal to two pitches. Otherwise, if the coils are separated by a distance which includes a fraction of the pitch, for example 2.3 pitches, the coils cannot be coaxial on the frame of the system. Although, the total power consumption required to heat the rotor 12 to the desired temperature is the same regardless of the number of induction coils 26, it is preferred to reduce the number of coils 26 to reduce the current intensity required to operate the coil, because higher current intensities require heavy equipment which is more expensive to buy and maintain. The more coils are used to heat a rotor, the faster the rotation speed and the advancement speed of the rotor though the coil.

Figure 12:
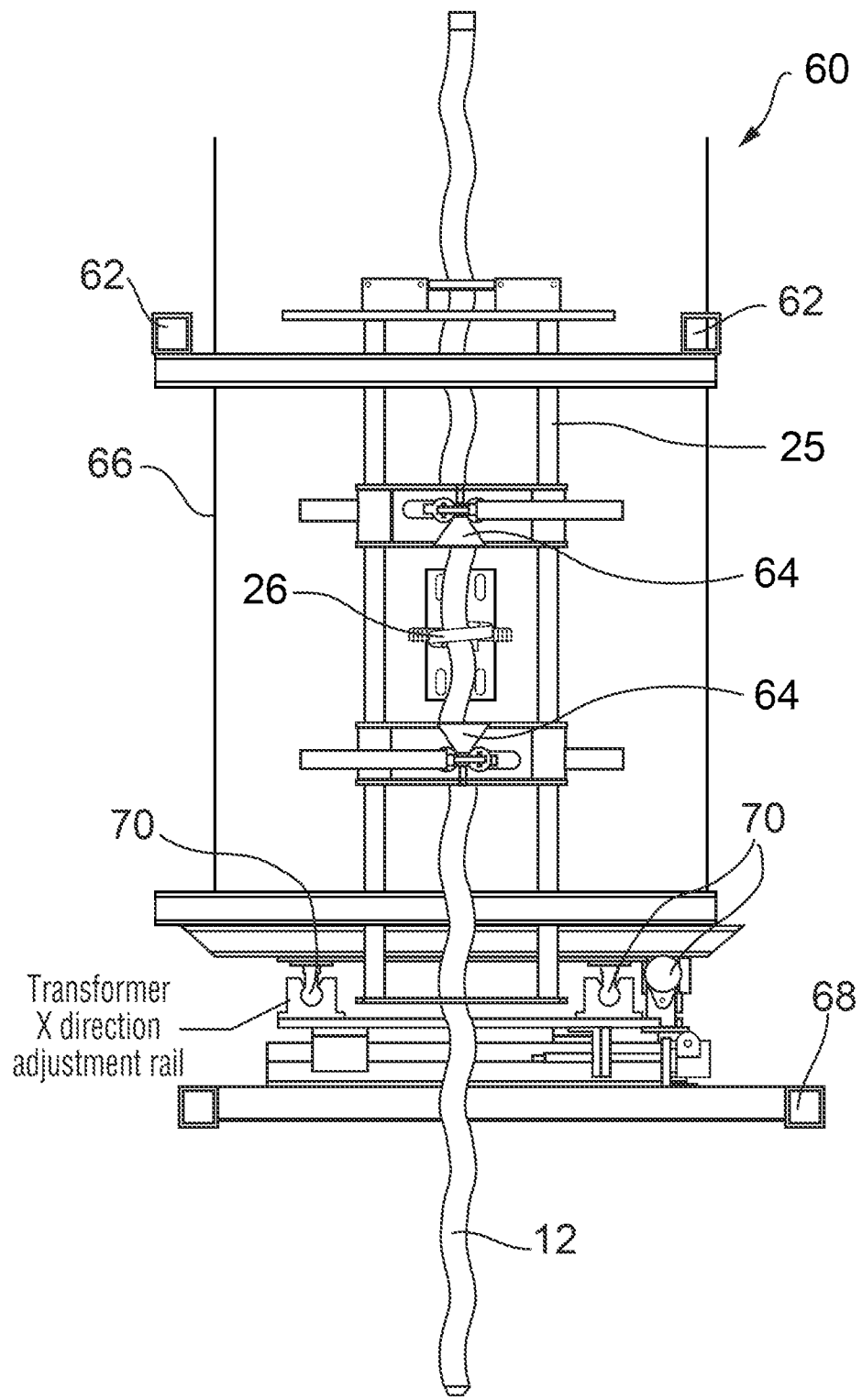
FIG. 12 illustrates an example of an induction heating apparatus in accordance with an embodiment of the invention.

FIG. 12 illustrates an example of an induction heating apparatus 60 in accordance with an embodiment of the invention. The heating apparatus 60 includes a frame 25 which is fixed to the floor by a rotor guide mount 62. The heating apparatus 60 also includes rotor guide rollers 64, a transformer 66, a transformer mount 68 fixed to the floor, and the induction coil 26. The rotor guide mount 62 the and rotor guide rollers 64 hold and guide the rotor as it rotates within the inner circumference of the coil. The induction coil 26 is attached to and powered by the transformer 66. The heating apparatus 50 includes a direction adjustment rail 70 in order to adjust the position of the transformer on the transformer mount 68 in both the X and Z axis directions. Since the coil 26 is attached to the transformer 66, the spacing 27 between the overlapping ends 28 of the induction coil 26 and the rotor 12 may be adjusted by adjusting the position of the transformer 66 on the transformer mount 68, in the X and Z axis directions.

In the embodiment shown in FIG. 12, adjustment of the position of the rotor with regard to the overlapping ends of the coil 26 is done by moving the coil with respect to the rotor in order to increase or decrease the spacing 27 between the rotor and the overlapping ends 28. However, although difficult and cumbersome, it is also possible to adjust the spacing 27 between the rotor and the overlapping ends 28 of the coil 26 by moving the rotor in the desired direction using adjustment means associated with the rotor guide mount 62.

The heating apparatus 60 includes an axial motion servo motor system (not shown) with a feedback control loop in order to control the advancement speed of the rotor through the coil 26. The advancement speed is fed into another servo system (not shown) which rotates the rotor 12 at a rate of the axial speed multiplied by the rotor pitch. This allows for a consistent placement of the rotor 12 inside the coil 26. Jogging switches (not shown) may also be used to allow for proper timing set-up between the rotor 12 and the coil 26 during operation. Keeping the rotor to coil placement consistent, and maintaining the speed accurately allows for control of the power settings for the induction coil, and makes it simple for the operator to control the temperature of the rotor 12 within the required range.

Figure 13:
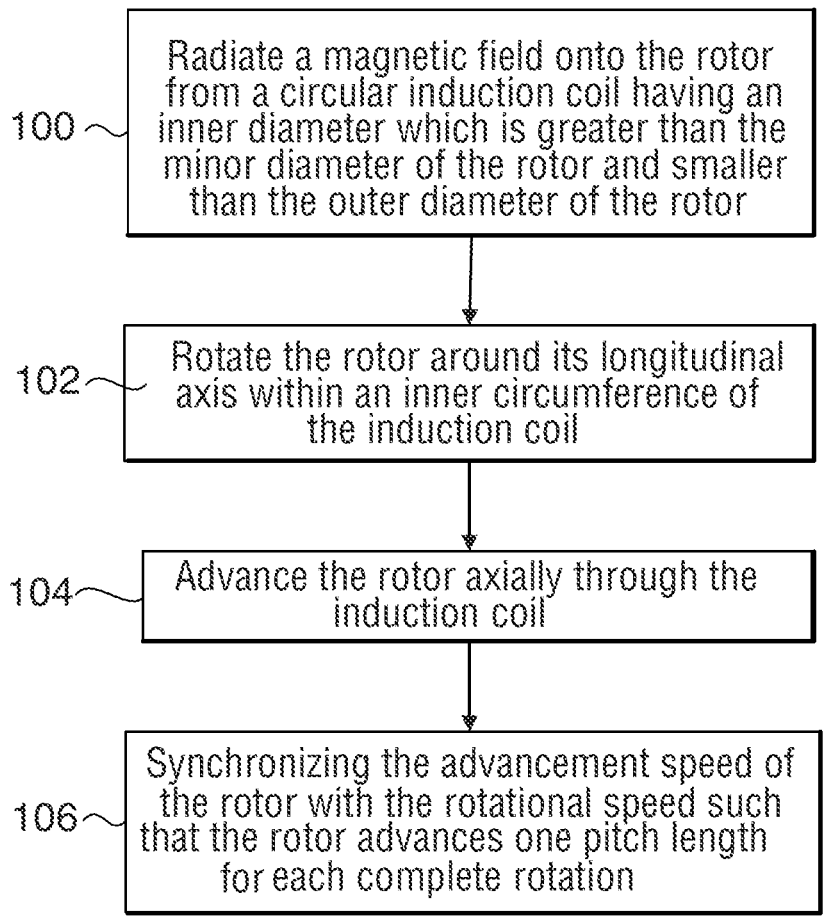
FIG. 13 is a flowchart illustrating a method of induction heating a helical rotor in accordance with an embodiment of the invention.

FIG. 13 is a flowchart illustrating a method of induction heating a helical coil, according to an embodiment of the present invention. At step 100, a magnetic field is radiated onto the rotor from a circular induction coil having an inner diameter which is greater than the minor diameter of the rotor and smaller than the major diameter of the rotor. At step 102, the rotor is rotated about its longitudinal axis within an inner circumference of the induction coil. At step 104, the rotor is advanced axially through the induction coil. At step 106, the advancement speed of the rotor is synchronized with the rotational speed such that the rotor advances one pitch length for each complete rotation.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A system for induction heating a helical rotor having an axis of rotation, a minor diameter, a major diameter and a pitch length, the system comprising:
   a frame including a rotor guide mount and rotor guide rollers for holding the helical rotor and advancing the helical rotor along the axis of rotation;
   a helical induction coil for radiating a magnetic field onto the helical rotor for induction heating the helical rotor, the helical induction coil having at least one loop with overlapping, adjacent ends, the loop having an inner diameter greater than the minor diameter of the helical rotor and smaller than the major diameter of the helical rotor;
   a support for holding the helical induction coil around the helical rotor, the support including adjustment means configured to maintain a gap between the helical rotor and the helical induction coil;
   a first motor mounted to the frame and connected to the helical rotor to rotate the helical rotor at a rotational speed about the axis of rotation within an inner circumference of the helical induction coil;
   a second motor mounted to the frame and connected to the helical rotor to advance the helical rotor at an advancement speed through the helical induction coil along the axis of rotation;
   synchronization means to synchronize the advancement speed of the helical rotor with the rotational speed to advance the helical rotor one pitch length through the helical induction coil for each complete rotation of the helical rotor.

2. The system of claim 1, wherein the helical coil has one loop with overlapping, adjacent ends.

3. The system of claim 1, wherein the overlapping ends of the at least one loop of the helical induction coil are spaced apart along the axis of rotation such that an inner surface of the helical induction coil substantially matches an exterior shape of the helical rotor.

4. The system of claim 1, wherein the adjustment means adjust a placement of the helical rotor within the inner circumference of the helical induction coil, by adjusting the gap between the helical rotor and the overlapping ends in relation to the pitch length.

5. The system of claim 4, wherein the adjustment means include a direction adjustment rail for adjusting a position of the helical induction coil around the helical rotor to adjust the gap between the helical rotor and the overlapping ends.

6. The system of claim 5, wherein the gap between the helical rotor and the overlapping ends is progressively decreased for rotors of increasing pitch length, and progressively increased for rotors of decreasing pitch length.

7. The system of claim 6, wherein the helical induction coil has a circular waveguide for shorter pitch rotors.

8. The system of claim 6, wherein the helical induction coil has a rectangular waveguide for longer pitch rotors.

* * * * *